United States Patent [19]

Gerhardt

[11] Patent Number: 4,847,336

[45] Date of Patent: Jul. 11, 1989

[54] PROCESS FOR THE PREPARATION OF ACRYLOYLOXYETHOXYMETHYL-MELAMINES

[75] Inventor: Robert F. Gerhardt, Dix Hills, N.Y.

[73] Assignee: Ulano Corporation, Brooklyn, N.Y.

[21] Appl. No.: 187,575

[22] Filed: Apr. 28, 1988

[51] Int. Cl.[4] .................................................. C08G 8/30
[52] U.S. Cl. ..................................... 525/518; 528/254; 528/423
[58] Field of Search ................ 525/518; 528/254, 392, 528/490, 423; 544/203

[56] References Cited

U.S. PATENT DOCUMENTS 3,020,255  2/1962  Magrane et al. ..................... 525/518
3,899,611  8/1975  Hall ....................................... 427/54

Primary Examiner—Theodore E. Pertilla
Attorney, Agent, or Firm—Charles E. Baxley

[57] ABSTRACT

The transetherification reaction between hydroxyethyl acrylate and hexamethoxymethyl-melamine to produce oligomeric acryloyloxyethoxymethyl-melamines, which can be polymerized to form useful films and castings, can be increased in rate to produce the oligomer having less impurities and other undesirable properties by running the reaction in a hydrocarbon solvent, such as hexane, in the presence of iodine.

8 Claims, No Drawings

PROCESS FOR THE PREPARATION OF ACRYLOYLOXYETHOXYMETHYL-MELAMINES

BACKGROUND OF THE INVENTION

This invention relates to compositions containing polymerizable unsaturated ethers of methylol-melamines. It particularly relates to polymerizable acryloyloxyethoxymethyl-melamines and to an improved process for the preparation of these compounds.

Unsaturated ethers of methylol-melamines, such as acryl- oyoleyxethoxymethyl-melamines, are readily polymerizable to hard films which are useful in coatings and castings. The preparation of these compounds is described in U.S. Pat. No. 3,020,255. In accordance with the process described in this Patent, the compounds are prepared by the transetherification reaction of an unsaturated alcohol and the methyl ethers of methylol-melamines. The unsaturated alcohol may contain other groups attached thereto. So, for example, a suitable unsaturated alcohol is acryloyloxyethanol; i.e., hydroxyethyl acrylate. In the transetherification reaction, the methyl groups in the methyl ethers of methylol-melamines are replaced by acryloyloxyethyl groups. The Patent also discloses the use of acidic catalysts such as, for example, formic, acetic, propionic, maleic, tartaric, trichloracetic, toluenesulfonic phosphoric, hydrochloric, hydrobromic, sulfuric, and nitric acids as catalysts in the transetherification reaction. The process described in the Patent is carried out at a temperature ranging from room temperature to about 75° C., although higher temperatures may be used. The methanol by-product which is formed was preferably removed by conducting the reaction under partial vacuum which facilitated the evaporation and consequent removal of this volatile compound.

However, as reported by Giacobbe, et al. in Macromolecules 4, (No. 5) 630 (1971), both the process described in the U.S. Pat. No. 3,020,255 and the products obtained thereby had serious shortcomings. Methylol-melamines can contain from one to six (1-6) methylol groups attached to the melamine nucleus. Usually, the methylol-melamines contain six (6) methylol groups; i.e., the compound is hexamethylol-melamine and the methyl ether thereof is hexamethoxymethyl-melamine. Giacobbe, et al. found the process of the U.S. Pat. No. 3,020,255 to be useful for the transetherification of only one (1) of the methoxy groups. Using the process, they could not replace more than two (2) of the methoxy groups by an acryloyloxyethoxy group. Furthermore, they found the reaction to be very slow at room temperature, and at elevated temperatures polymerization occurred.

Other shortcomings in the process described in the Patent and the products obtained therefrom include self-polymerization of the product during the reaction and side reactions, particularly the methanolysis of the hydroxyethyl acrylate to produce ethylene glycol and methyl acrylate. Ethylene glycol reacts with the melamine product resulting in undesirable gellation. Methyl acrylate has an objectionable odor and is toxic. For these reasons, its presence in the product is undesirable. The presence of these undesirable materials thus necessitates further purification of the reaction mixture containing the product before it is suitable for use.

THE INVENTION

It is, accordingly, an object of this invention to provide a rapid process for the transetherification reaction between hexamethoxymethyl-melamine and hydroxyethyl acrylate.

It is another object of this invention to provide a rapid process for the transetherification reaction between hexamethoxymethyl-melamine and hydroxyethyl acrylate in which, if desired, all of the methoxy groups in hexamethoxymethyl-melamine can be replaced by acryloyloxyethoxy groups.

It is a further object of this invention to provide a rapid process for the transetherification reaction between hexamethoxymethyl-melamine and hydroxyethyl acrylate in which the reaction mixture contains substantially no unreacted starting materials.

It is still another object of this invention to provide a rapid process for the transetherification reaction between hexamethoxymethyl-melamine and hydroxyethl acrylate in which the reaction mixture containing the product can be used directly without further purification.

It is still another object of this invention to provide a rapid transetherification process in which the methanol by-product of the transetherification is readily removed during the course of the reaction.

Other objects will appear in the description which follows:

In accordance with this invention, it has been found that the addition of elemental iodine to the reaction mixture will increase the rate of the transetherification reaction between hydroxyethyl acrylate and methoxymethyl-melamine to yield acryloyloyyethoxymethyl-melamine. The reaction is preferably carried out at elevated temperatures in a solvent.

The solvent may be a hydrocarbon, which is cyclic or acyclic and the acyclic hydrocarbon may be straight chained or branched, or a halogenated derivative thereof, having a boiling point in the range from about 40° to about 100° C., and low miscibility with methanol. Hexane is the preferred solvent.

The amount of iodine can range from about 0.02% to about 1.5% by weight of the combined weight of the reactants. The preferred range is from about 0.1% to about 0.4%. The iodine may be added directly or in a solution in appropriate solvent such as benzene or toluene.

The reaction is preferably carried out under reflux at a temperature range from about 70° to about 100° C. At this temperature, the methanol that is formed during the transetherification is azeotropically distilled and is separated from the reaction by collecting the distillate in a condenser/trap device such as a Dean-Stark tube or any suitable modification thereof. The methanol can thus be removed and the hexane returned to the reaction mixture.

The methoxymethyl-melamine can contain from one to six (1-6) methoxymethyl groups, but because of its ready availability it is preferred to use hexamethoxymethyl-melamine. However, methoxymethyl-melamines containing fewer than six (6) methoxymethyl groups may be used. Since up to six (6) methoxy groups per the methoxymethyl-melamine molecule can be replaced in the transetherification reaction, the number of groups which can be replaced will depend upon the amount of hydroxyethyl acrylate in the reaction mixture; the theoretical ratio for the replacement of all six (6) methoxy groups by six (6) acryloyloxyethoxy groups being six (6) mols of hydroxyethyl acrylate to one (1) mol of hexamethoxymethyl-melamine. However, it is not necessary to have all of the methoxy groups replaced by acryloyloxyethoxy groups and compositions containing melamine compounds in which some methoxy groups are still present are still useful for polymerization to give the desired polymeric films. Therefore, a molar ratio smaller than 6:1 for hydroxyethyl acrylate to hexamethoxymethyl-melamine may be used with good results in both the reaction and the product.

Methoxymethyl-melamine is available from American Cyanamid as Cymel 303, a viscous liquid, low cost grade of hexamethoxymethyl-melamine, Cymel 300, a purer semi-solid relative of Cymel 303; and Cymel 350, a partially condensed higher molecular weight version. Any of these Cymels may be used in the process.

Hydroxyethyl acrylate is available from Rohm and Haas as Rocryl 420. This product contains about 450 ppm of 4-methoxyphenol, a polymerization inhibitor.

Other hydroxyl-bearing monomers such as, for example, hydroxyethyl methacrylate, hydroxypropyl acrylate, hydroxypropyl methacrylate, and the like may be used in place of hydroxyethyl acrylate.

The invention will be made clearer from the examples which follow. These examples are given by way of illustration and are not to be considered as limiting.

EMBODIMENTS OF THE INVENTION

Example 1

This example illustrates the preferred embodiment of the invention.

A mixture of 1,500 g (3.85 mols) of hexamethoxymethylmelamine (Cymel 303), 1,500 g (12.93 mols) of hydroxyethyl acrylate (Rocryl 420), 150 g technical grade hexane, and 6.0 g iodine dissolved in 54 g toluene (a 10% solution) was charged into a 4-liter reaction flash fitted with a thermometer, heating mantle and three (3) condenser/trap devices. The mixture was heated under a reflux temperature from about 80° to about 100° C., and methanol was continuously separated by means of the condenser/trap devices over a period of four to eight (4–8) hours. The hexane was then removed by boiling out by heating the reaction mixture up to 120° C.

The product was a slightly-viscous, highly active, multifunctional acrylate oligomer which previously had been available only in a highly impure form in small laboratory quantities. It has substantially no methyl acrylate odor, possessed by commercially available products, and is useful in all compositions in film formation described in U.S. Pat. Nos. 3,020,255 and 3,899,611. It showed no sign of instability after storage for 6 months in an amber glass bottle.

Example 2

The process of Example 1 was repeated using 1,500 g (3.85 mols) hexamethoxymethyl-melamine, 2,680 g (23.10 mols) hydroxyethyl acrylate, 250 g commercial hexane, and 9.0 g iodine (as a 10% by weight solution in toluene). Results as to the course of the reaction and the properties of the product were similar as in Example 1.

Example 3

The procedure of Example 1 was repeated using 1,500 g (3.85 mols) of hexamethoxymethyl-melamine, 1,215 g (10.47 mols) hydroxyethyl acrylate, 150 g commercial hexane, and 7.0 g iodine (as a 10% by weight solution in toluene). Results as to the course of the reaction and the properties of the product were the same as in Example 1.

Example 4

60g Rocryl 420
40g Cymel 303
5 g hexane
2 g 10% iodine solution in toluene

After 5 hours reflux at 161° to 170° F, 14.1 g of methanol were collected, representing 83.7% reaction of the hydroxyethyl acrylate. The physical appearance was similar to the product of Example 1.

Example 5

The procedure and ingredients of Example 4 were used except that Cymel 300 was used in place of Cymel 303. After 3½ hours reflux at 163° to 190° F, 12.8 g of methanol were collected, equivalent to 91.2% reaction of the hydroxyethyl acrylate.

In none of the above examples, as well as in numerous other reactions similarly run in various batch sizes was there any gellation of the product in the reaction vessel. Examples 6 and 7 illustrate the use of prior art processes wherein no iodine was present.

Example 6

This was a duplication of Example 4, but the iodine was replaced by methane sulfonic acid. After 2½ hours reflux at 160° to 190° F, 12.9 g of methanol had been collected when the batch suddenly gelled.

Example 7

This procedure of Example 1 of U.S. Pat. No. 3,020,255 (at column 8, lines 5 ff) was repeated except that 20 parts of hexane replaced xylene azeotropic to facilitate the azeotropic removal of the methanol and hydroxyethyl acrylate was used in place of beta hydroxyethyl methacrylate. After only 7 minutes of reflux at 160° to 164° F, 2½ g of methanol had been collected when the batch suddenly gelled.

I claim:

1. In a process for the preparation of acryloyloxyethoxymethyl-melamines by the transetherification reaction between hydroxyethyl acrylate and methoxymethyl-melamines, the improvement which comprises running the reaction in a hydrocarbon solvent in the presence of a catalyst which is elemental iodine.

2. A process according to claim 1 in which the methoxymethyl-melamine is hexamethoxymethyl-melamine.

3. A process according to claim 2 wherein the amount of iodine used is from about 0.02% to about 1.5% by weight of the combined weight of hexamethoxymethyl-melamine and hydroxyethyl acrylate.

4. A process according to claim 3 wherein the hydrocarbon solvent is hexane.

5. A process according to claim 4 wherein the reaction is run at a temperature from about 70° to about 100° C.

6. A process according to claim 5 wherein the methanol formed during the reaction is azeotropically distilled and condensed in a condenser/trap.

7. A process according to claim 5 wherein the amount of iodine is from about 0.1% to about 0.4% by weight.

8. A process according to claim 7 wherein the amount of iodine is about 0.2% by weight.

* * * * *